(12) United States Patent
Belling et al.

(10) Patent No.: US 9,614,714 B2
(45) Date of Patent: Apr. 4, 2017

(54) SIGNALING REFERRING TO SETUP OF H.324 VIDEO TELEPHONE BETWEEN MEDIA GATEWAY AND CONTROLLER

(75) Inventors: Thomas Belling, Erding (DE); Hans-Jürgen Hanisch, München (DE); Franz Kalleitner, St. Georgen im Attergau (AT); Norbert Seitter, Kempten (DE); Andreas Trapp, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1225 days.

(21) Appl. No.: 12/083,874

(22) PCT Filed: Sep. 8, 2006

(86) PCT No.: PCT/EP2006/066154
§ 371 (c)(1),
(2), (4) Date: Apr. 21, 2008

(87) PCT Pub. No.: WO2007/045526
PCT Pub. Date: Apr. 26, 2007

(65) Prior Publication Data
US 2009/0116477 A1    May 7, 2009

(30) Foreign Application Priority Data

Oct. 21, 2005    (DE) .................... 10 2005 050 588

(51) Int. Cl.
*H04L 29/06*    (2006.01)
(52) U.S. Cl.
CPC .. *H04L 29/06027* (2013.01); *H04L 29/06176* (2013.01); *H04L 65/103* (2013.01);
(Continued)

(58) Field of Classification Search
None
See application file for complete search history.

(56) References Cited

U.S. PATENT DOCUMENTS 6,856,612 B1 * 2/2005 Bjelland et al. ............. 370/338
6,871,070 B2 * 3/2005 Ejzak ......................... 455/435.1
(Continued)

FOREIGN PATENT DOCUMENTS

| WO | 01/05109 A1 | 1/2001 | |
|----|-------------|--------|---|
| WO | 2005/032164 A1 | 4/2005 | |
| WO | WO 2005032164 A1 * | 4/2005 | ............. H04Q 3/00 |
| WO | 2005/112392 A2 | 11/2005 | |

OTHER PUBLICATIONS

ITU-T, H.245 protocol, Jul. 2003.*
(Continued)

*Primary Examiner* — Jae Y Lee
*Assistant Examiner* — Aixa Guadalupe-Cruz
(74) *Attorney, Agent, or Firm* — Slayden Grubert Beard PLLC

(57) ABSTRACT

A video telecommunication connection is established via a landline telecommunications network and an IP multimedia subsystem telecommunications network using a media gateway control function of at least one Internet multimedia-media gateway device in the IP multimedia subsystem telecommunications network. An H.223 multiplex level usable for a telecommunication connection is exposed to an H.223 protocol negotiation, in carrying out an H.245 protocol negotiations for setting up the H.223 protocol negotiations connection for a telecommunication connection. A media gateway control function device is informed when the H.223 logic channels are open by H.245 signaling, thereby enabling the Internet multimedia-media gateway device of the IP multimedia subsystem telecommunications network to carry out at least part of the setup.

32 Claims, 4 Drawing Sheets

Termination:
T1 CS domain (CS bearer (BS30) for H.245 control, voice, video)
T2 Multiplexing (H.245 control, voice, video)
T3 Video (dedicated RTP bearer 1)
T4 Voice (dedicated RTP bearer 2)

Stream:
Stream1 (T1 and T2) data (H.245 control, voice, video)
Stream2 (terminates at T2) H.245 control information
Stream3 (T2 and T3) video information
Stream4 (T2 and T4) voice information

(52) U.S. Cl.
CPC ...... *H04L 65/1006* (2013.01); *H04L 65/1009* (2013.01); *H04L 65/1043* (2013.01); *H04L 65/1046* (2013.01); *H04L 65/1069* (2013.01)

(56) References Cited

U.S. PATENT DOCUMENTS

| | | | |
|---|---|---|---|
| 7,136,651 B2* | 11/2006 | Kalavade | 455/445 |
| 7,257,111 B2* | 8/2007 | Groves et al. | 370/352 |
| 2004/0043793 A1 | 3/2004 | Sakata | |
| 2005/0009519 A1* | 1/2005 | Murai et al. | 455/432.2 |
| 2007/0165598 A1* | 7/2007 | Hynonen et al. | 370/352 |

OTHER PUBLICATIONS

ITU-T, H.248.12 Amendment 1, Nov. 2002.*
ETSI, TS 129 163 v.6.7.0, Jun. 2005.*

Digital cellular telecommunications system (Phase 2+); Universal Mobile Telecommunications System (UMTS); Interworking between the IP Multimedia (IM) Core Network (CN) subsystem and Circuit Switched (CS) networks (3GPP TS 29.163 version 6.6.0 Release 6); Mar. 2005; pp. 1-128.
"Digital cellular telecommunications system (Phase 2+); Universal Mobile Telecommunications System (UMTS); Packet switched conversational multimedia applications; Default codecs (3GPP TS 26.235 version 6.4.0 Release 6)"; Mar. 2005; pp. 1-16.
"Digital cellular telecommunications system (Phase 2+); Universal Mobile Telecommunications System (UMTS); Codec for circuit switched multimedia telephony service; General description (3GPP TS 26.110 version 6.0.0 Release 6)"; Dec. 2004; pp. 1-16.
International Search Report for International Application No. PCT/EP2006/066154; mailed Jan. 17, 2007.
Office Action issued by the Chinese Patent Office on Mar. 14, 2011 in the related Chinese patent application No. 200680039110.2.

* cited by examiner

Block diagram of key components

Context for a video call

Termination:
T1 CS domain (CS bearer (BS30) for H.245 control, voice, video)
T2 Multiplexing (H.245 control, voice, video)
T3 Video (dedicated RTP bearer 1)
T4 Voice (dedicated RTP bearer 2)

Stream:
Stream1 (T1 and T2) data (H.245 control, voice, video)
Stream2 (terminates at T2) H.245 control information
Stream3 (T2 and T3) video information
Stream4 (T2 and T4) voice information

SIGNALING REFERRING TO SETUP OF H.324 VIDEO TELEPHONE BETWEEN MEDIA GATEWAY AND CONTROLLER

CROSS REFERENCE TO RELATED APPLICATIONS

This application is based on and hereby claims priority to German Application No. 10 2005 050 588.0 filed on 21 Oct. 2005, the contents of which are hereby incorporated by reference.

BACKGROUND

Described below are methods and devices for setting up a telecommunications connection.

Alongside the so-called 'Circuit-Switched (CS) domain' of a mobile communications network based on the 3rd Generation Partnership Project (3GPP), the so-called 'IP Multimedia Subsystem' (IMS) can also be utilized for voice and video telephony, and a so-called 'Interworking' of the relevant services, i.e. connecting of the services by a suitable conversion of the signaling used and the transport format used for the data, between the IMS and the CS domain, is required. The IMS is also used, alongside the 3GPP Global System for Mobile Communications (GSM) and Universal Mobile Telecommunications System (UMTS) access networks, for other access networks, for example the Wireless Local Area Network (WLAN) and Digital Subscriber Line (DSL). Precisely in these scenarios, it can initially be anticipated that voice and video telephony are effected by way of the IMS. Video telephony can also be utilized in a public telephone network, i.e. a so-called 'Public Switched Telephone Network (PSTN)', with the same inband video telephony specific protocols as in the 3GPP CS domain being utilized for transport and signaling in this instance as a rule. An interworking with respect to the IMS is also required from the PSTN.

Up to now, just an interworking between the IMS and the CS domain or the PSTN, and only for voice telephony, has been described in the standard. The method described below relates to the corresponding interworking of video telephony. A demand for this can be foreseen since video telephony is gaining in importance both in the 3GPP CS domain and also in the IMS, in this instance particularly for access networks such as WLAN or DSL, or newly arising network access options (e.g. Worldwide Interoperability for Microwave Access (WiMAX)).

The interworking between the IMS and a CS network, that is to say a PSTN or a 3GPP CS domain, is specified, as from 3GPP Release 6, only for pure voice telephony in 3GPP TS 29.163.

As defined by TS 29.163, the interworking of the so-called 'call control' signaling is effected in the so-called 'Media Gateway Control Function' (MGCF). The interworking of the payload connection, that is to say the passing on and repacking and also where necessary the transcoding of the payload data, is effected in the so-called 'Internet Multimedia-Media Gateway' (IM-MGW). The MGCF controls the IM-MGW by using the H.248 protocol standardized by the ITU-T, by way of the so-called 'Mn' interface, as is described further in 3GPP TS 29.332.

In the CS network, Bearer Independent Call Control (BICC) or ISDN User Part (ISUP) is used for call control signaling. In this case, if the call control signaling is routed separately from the transport connections, this method is also designated as 'out-of-band' signaling. As a further consequence, the possibility also exists of exchanging signaling messages within the transport connection, which messages are designated as 'in-band' signaling operations. In the case of ISUP, Time Division Multiplex (TDM) is utilized as the transport in the CS network and in the case of BICC, packet transport by using Internet Protocol (IP) or Asynchronous Transfer Mode (ATM). The negotiation as to whether pure voice telephony or video telephony is used can be effected for ISUP during the call control signaling for setting up the call, by using the so-called ISUP 'UDI Fallback' procedure. For BICC, this negotiation can be effected by using the 'Service Change and UDI Fallback' (SCUDIF) standardized in 3GPP TS 23.172, which enables a switch between voice telephony and video telephony even during the call. Both 'UDI Fallback' and SCUDIF utilize out-of-band signaling. Alongside this, it is possible for ISUP and also BICC not to use the aforesaid procedures, and to attempt a call setup only for video telephony, and in the case that video telephony is not supported, to terminate the call setup. In contrast to the optional negotiation between voice and video, the negotiation of the voice and video codecs used for video telephony is effected in-band, after video telephony has already been selected previously and a corresponding transport connection ('bearer') has been set up. For video telephony, a so-called 'BS30' data connection with 64 kbyte/s bandwidth is used in the CS network. Within this data connection, the H.324 protocol suite standardized by the ITU-T is used, the variant H.324M adapted for mobile communication being selected in the 3GPP CS domain. In this respect, following the setup of the data connection, the configuration of the multimedia connection is negotiated inband by way of the H.245 protocol standardized by the ITU-T, particularly the video codec and voice codec used and the details of the respective codec configuration. Voice and video are multiplexed within the same transport connection by using the H.223 protocol. For the 3GPP CS domain, TS 26.110 describes the use of the H.245 protocol suite in further detail, the so-called 'H.324M' configuration in particular being selected.

The main sequences during the setting up of a 3G-324M connection ('session') are as follows:

1. Following the beginning of the ISUP or BICC call setup signaling, the reservation of the necessary resources that are needed for the desired bearer is effected, and as a further consequence, the setup of the transport connection.
2. Beginning of the in-band negotiation. First, negotiation as to which H.223 multiplexer level is to be used for this transport connection.
3. Detection of the leading terminal which opens the multistream connection by using H.245 negotiation, if necessary. This function is only necessary if a conflict arises in the context of the opening of a bidirectional logical channel. This function is designated as 'Master or Slave Determination' (MSD).
4. By using so-called 'Terminal Capability Set' H.245 messages, the capabilities of the terminal sending the message are transmitted. Such messages are sent independently by both terminals. These described capabilities encompass the following information: audio and video codecs and their specific properties or their forms respectively, functional scope of the multiplexer, which adaptation layer is supported in detail (e.g. 'simple' or 'nested' multiplexing), and its mobile specific enhancements.
5. Setup of 'logical' channels for each media stream by using H.245 signaling. As from this point in time, either with or without MSD, the terminal or the IM-MGW is ready to open logical channels in order to enable the exchange of voice and/or video payload data. During the creation of a bidirectional logical channel, the channel number and the definitive media capabilities to be used are defined.

6. Definition of the multiplexing properties by using H.245.

7. Beginning of the transfer of video, audio/voice or data.

In the IMS, the negotiation for video telephony is effected out-of-band with the aid of the so-called 'Session Description Protocol' (SDP), IETF RFC 2327, which is transported by using the so-called 'Session Initiation Protocol' (SIP), IETF RFC 3261. In this respect, the negotiation as to whether voice telephony or video telephony is used is connected with the negotiation of the codecs used, and is effected before or during the setup of the bearers. The so-called SDP 'offer-answer' mechanism as defined by RFC 3264 is used. In this respect, the offering party sends a list of supported codecs in the SDP 'offer' message. Following receipt of this message, the answering party sends an SDP 'answer' message that contains those codecs from the list that it also supports and wishes to use. The answering party must not specify any codecs that were not contained in the list in the SDP 'offer'. In contrast to the CS domain, two separate transport connections (bearers) are utilized for voice and video, which use the so-called 'Real Time Transport Protocol' (RTP), IETF RFC 3550 in each case. For the 3GPP IMS by way of the General Packet Radio Service (GPRS) access network, 3GPP TS 26.235 describes the codecs to be used for video telephony.

The protocols and codecs used for video telephony on the CS domain side and on the IMS side are summarized once again in the following:

CS Network (in Particular 3GPP CS Domain):

| Call control: | BICC or ISUP<br>Negotiation between pure voice telephony and video telephony can be effected by using 'UDI Fallback' for ISUP and by using 'SCUDIF' for BICC. |
|---|---|
| Multimedia Protocol suite: | H.324M (H.324 Annex C): |
| Codec negotiation: | H.245 inband negotiation by way of the set-up CS bearer at 64 kbit/s |
| Video codec: | Support for H.263 prescribed<br>H.261 optional<br>MP4V-ES (simple video profile level 0) optional |
| Voice codec: | Support for NB-AMR prescribed<br>WB-AMR optional<br>G.723.1 recommended |
| Transport: | Multiplexing of voice and video on a bearer as defined by H.223 Annex A-B |

IMS (Codecs for GPRS Access Network):

| Call control: | SIP<br>Contains both negotiation between pure voice telephony and video telephony, and also codec negotiation. |
|---|---|
| Codec negotiation: | Before setup of the bearer out-of-band by using SDP, which is transported in SIP |
| Video codec: | Support for H.263 prescribed<br>H.264 optional<br>MP4V-ES (simple video profile level 0) optional |
| Voice codec: | Support for NB-AMR and WB-AMR prescribed |
| Transport: | Two separate RTP bearers for voice and video with the use of different so-called RTP 'payload' formats - |

-continued

| |
|---|
| Voice: Nb-AMR + WB-AMR: IETF RFC 3267<br>Video: H.263: IETF RFC 2429<br>H.264 (AVC): IETF RFC 3984<br>MPEG-4: IETF RFC 3016<br>Synchronization of parallel RTP media streams is effected by using so-called RTP 'timestamps', which are negotiated by the Real Time Control Protocol (RTCP, see IETF RFC 3550). |

Alongside or in place of the codecs specified in this instance, however, other codecs can also be supported by the terminals, in particular if the CS terminals are located in the PSTN or if the IMS terminals are not using GPRS as the access network.

It is desirable to use the same video codec and if possible also the same voice codec on the CS side and in the IMS, in order to avoid a transcoding operation. A transcoding of the video codec in particular, but to a lesser extent also of the voice codec, would require considerable computing power and resources in the IM-MGW. Additionally, the transmission would become delayed and the quality of the image or the voice respectively would become worse. If the required bandwidth for the codecs is different on the CS domain side and the IMS side, additional bandwidth would be used on one side without the image or voice quality improving as a result.

For this purpose, it is a requirement that the MGCF and the IM-MGW exchange suitable information referring to the negotiation of the voice and video codecs by using H.245 and SIP/SDP, and referring to the setup of the transport connection by using H.223.

A method for exchanging suitable information referring to the negotiation of the voice and video codecs by using H.245 and the setup of the transport connection by using H.223 between the MGCF and the IM-MGW forms the subject matter of the method. As a result, a transcoding for video telephony is largely avoided. The MGCF and the IM-MGW connect a CS network, that is to say a PSTN or a 3GPP CS domain, and also an IP network, which uses SIP and SDP for negotiating the codecs, that is to say for example the IMS.

SUMMARY

An aspect is to support a setup of a suitable telecommunications connection by way of a circuit-switched network and an IMS network as efficiently as possible and to avoid a video telephony transcoding operation as far as possible.

Accordingly, the so-called 'H.245 client', that is to say the functional unit that terminates the H.245 protocol, is located in the IM-MGW. The H.245 client exchanges information referring to the selection of the codecs and the sequence of the call setup with the functional components in the MGCF in charge of the so-called 'call control', preferably with the functional component(s) that are in charge of the handling of the SIP and the SDP on the IMS side. For this purpose, the protocol of the 'Mn' interface is suitably enhanced.

For example, if the MGCF detects or presumes from the call control signaling during the call setup that video telephony as defined by the H.324 is required on the CS side, the MGCF instructs the IM-MGW:

to implement the H.223 negotiation of the so-called 'multiplex level' autonomously, and to implement the H.245 negotiation necessary for the setup of H.324 video telephony, and to inform the MGCF as soon as logical H.223 channels are opened by using H.245, and the IM-MGW carries out the corresponding instructions.

Preferably, the MGCF configures the IM-MGW correspondingly by using so-called H.248 'Add' or 'Modify' messages, for example if it is establishing the so-called 'termination' in charge of the handling of the multiplexed H.223 protocol. Preferably, the MGCF inserts one or more so-called H.248 'signals', which are to be newly standardized, in these messages, which state that the H.223 and/or H.245 negotiation should be implemented.

In order to demand a notification about the setup of logical H.223 channels, the MGCF preferably utilizes a so-called H.248 'event', which is to be newly standardized for the purpose, which the MGCF preferably inserts in the same H.248 message. If in the following a logical H.223 channel is opened by using H.245 signaling, the IM-MGW utilizes a so-called H.248 'Notify' message according to the method, in which it specifies the newly defined 'event'.

It is advantageous if the IM-MGW specifies the selected codec and also the so-called 'Logical Channel Number' in the notification about the opening of a logical H.223 channel, preferably as parameters of the event used in the notification. The MGCF utilizes this information according to the method to configure the IM MGW in such a way that it passes the media stream through between the CS network side and the IMS side. The MGCF specifies for both sides which codecs have been chosen. On the CS network side, the specification 'Logical Channel Number' is required as defined by the existing H.248 standard. If the same codec has been chosen in the same configuration on both sides, the IM-MGW does not need to use a transcoder.

It is advantageous if the IM-MGW also notifies the MGCF if the H.223 negotiation of the multiplex level has been terminated or if this negotiation has failed respectively. The MGCF can establish by the absence of the notification or with the aid of an error message that the CS-side transport connection is not or not yet being used for video telephony, and respond to this in the call control signaling, for example by reconfiguring the call to another service such as voice telephony or terminating the connection.

In order to demand a notification about the result of the H.223 negotiation of the multiplex level, the MGCF preferably utilizes a so-called H.248 'event', which is to be newly standardized for the purpose, which the MGCF preferably likewise inserts in the H.248 message for beginning the H.223 negotiation. If in the following the negotiation has been terminated, the IM-MGW utilizes a so-called H.248 'Notify' message according to the method, in which it specifies the newly defined 'event'.

In the case of a call setup from the CS network side in the direction of the IMS, it can happen that the connection setup is forwarded by the IMS to another MGCF. In this case, it is advantageous if the MGCF configures the IM-MGW in such a way that it passes on the BS30 data service transparently, for example by making use of the so-called 'Clearmode' codec, IETF RFC 4040. The MGCF negotiates the transparent transport of the data service by using the SIP/SDP signaling exchanged with the other MGCF. In one embodiment, the MGCF configures the IM-MGW only for the BS30 service initially, and does not yet establish the data connection. As soon as the MGCF receives signaling referring to the selected codec from the IMS side, the MGCF can detect whether video telephony is involved and in this case configures the IM-MGW in such a way that it begins the inband H.223 negotiation. If, on the other hand, a transparent transport is selected, no reconfiguration of the IM-MGW is required.

The IM-MGW preferably implements the H.245 procedures for the so-called 'Master Slave Determination' autonomously.

In a simple embodiment, the IM-MGW also sends and receives the so-called H.245 'Terminal Capability Set' messages autonomously. These contain information about, among other things, audio and video codecs supported and their specific properties and also about the functional scope of the multiplexer (e.g. which adaptation layer is supported, the multiplexing nesting depth supported, that is to say so-called 'simple' or 'nested' multiplexing, and information about mobile specific enhancements). The IM-MGW specifies preconfigured values in the Terminal Capability Set message sent, which values reflect its own capabilities.

In a simpler embodiment, the transfer of codecs between the MGCF and the IM-MGW is omitted, and the MGCF and the IM-MGW are configured in such a way that they select the same voice and video codecs in the SIP/SDP out-of-band negotiation on the IMS side or in the H.245 inband negotiation on the CS network side respectively. This embodiment can be sufficient since, as defined by 3GPP TS 26.235 and TS 26.110, the same voice and video codecs have to be supported in the CS domain and the IMS.

In an alternative embodiment, however, the IM-MGW exchanges information referring to the codecs supported with the MGCF.

In an advantageous embodiment, the MGCF advises the IM-MGW as to which codecs the IM-MGW should specify in the Terminal Capability Set message sent, and in each case also advises the details of the codec configuration. Preferably, the MGCF selects codecs for this which it has received from the SIP/SDP signaling on the IMS side. In one embodiment, the MGCF also takes account, during the selection, of which codecs are supported at the IM-MGW. The MGCF either possesses configured knowledge about these capabilities or it retrieves these capabilities from the IM-MGW by using a so-called H.248 'AuditCapabilities' message. In an alternative embodiment, the IM-MGW removes those among the codecs received from the MGCF that it does not itself support before it sends the codecs in a Terminal Capability Set message.

The MGCF preferably specifies the codecs in an 'Add' or 'Modify' message as parameters of the signal that instructs the IM-MGW to implement the H.245 negotiation.

The MGCF can already specify the codecs if it instructs the IM-MGW to start the H.245 negotiation, or in a separate H.248 message at a later point in time, for example if it receives corresponding information in an SIP message. If the MGCF wishes to only specify the codecs at a later point in time, it preferably instructs the MGCF to wait for this message. For this purpose, the MGCF preferably utilizes a special parameter of the signal that instructs the IM-MGW to implement the H.245 negotiation. If the MGCF has not sent any codecs and the MGCF has not made a request to wait, the IM-MGW sends a Terminal Capability Set message containing preconfigured values.

In an advantageous embodiment, the IM-MGW also advises the MGCF as to which codecs it has received in a Terminal Capability Set message, and in each case also specifies the detailed configuration of the codec in this respect. Preferably, however, the IM-MGW does not advise the MGCF of received codecs that it does not itself support. The MGCF preferably passes this information on to the terminal on the IMS side by using SIP/SDP.

In order to demand a notification about the codecs received, the MGCF preferably utilizes a so-called H.248 'event', which is to be newly standardized for the purpose, which the MGCF preferably inserts in the same H.248 message in which it instructs the IM-MGW to start the H.245 negotiation. If in the following the IM-MGW receives a Terminal Capability Set message, the IM-MGW utilizes a so-called H.248 'Notify' message according to the method, in which it specifies the newly defined 'event', and specifies the codecs as parameters of this event.

In one embodiment, the IM-MGW, after the exchange of the H.245 Terminal Capability Set messages and the completion of the H.245 Master Slave Determination, opens logical H.223 channels autonomously assuming that it is in charge of such according to the outcome of the Master Slave Determination. In this respect, the IM-MGW chooses suitable codecs from the set of the codecs transferred in the Terminal Capability Set messages, preferably one voice codec and one video codec in each case, and then opens the channels by using so-called H.245 'Open Logical Channel' messages. As described above, the IM-MGW informs the MGCF about the opening of the channels.

In an alternative embodiment, the MGCF instructs the IM-MGW to set up the logical channels for specific codecs, preferably by specifying the codecs as special parameters of a suitable signal, which is to be newly standardized, within an H.248 'Modify' message. If the MGCF wishes to use such a signal, it preferably instructs the MGCF to wait for this message. For this purpose, the MGCF preferably utilizes a special parameter of the signal that instructs the IM-MGW to implement the H.245 negotiation.

In an embodiment, the IM-MGW also informs the MGCF if the inband negotiation using H.245 has failed, for example because no matching capabilities were found that would have permitted a transmission of video telephony. If the inband negotiation was unsuccessful, the MGCF can either clear down the call or initiate a fallback to voice, it being possible for the MGCF to use the so-called 'Service Change and UDI Fallback' (SCUDIF), 3GPP TS 23.172, on the CS side, and also a SIP/SDP codec renegotiation by using a SIP re-INVITe message on the IMS side.

The MGCF can instruct the IM-MGW, either as early as during the first configuring of the so-called 'terminations' or after notification about a successful inband negotiation, to establish the connection. As soon as the MGCF instructs the IM-MGW to connect the video call through, the IM-MGW compares the settings for the video codec and the voice codec in order to decide whether transcoding is necessary for the video signal and/or the voice signal.

BRIEF DESCRIPTION OF THE DRAWINGS

Further features and advantages These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Figure 1:
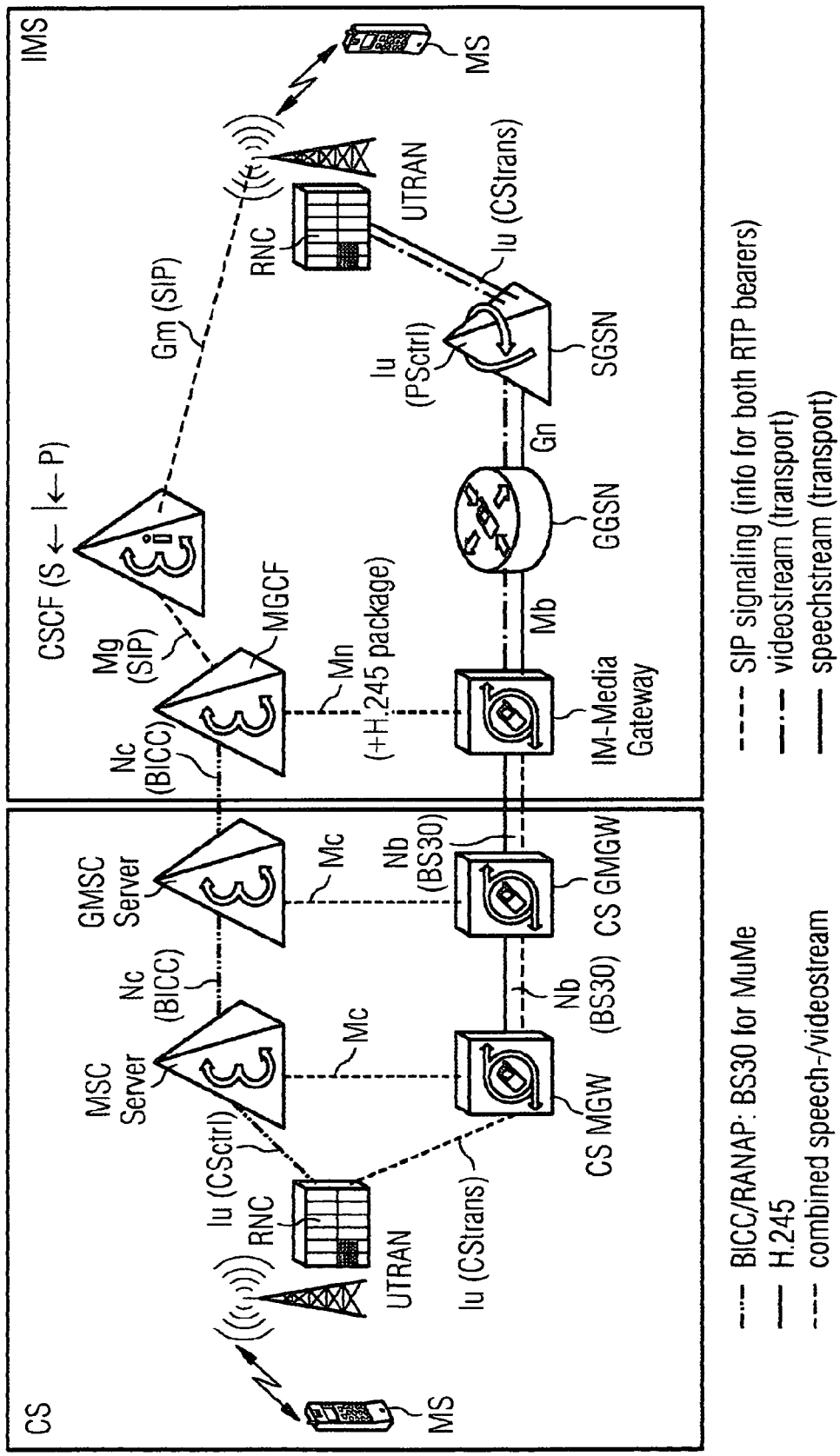
FIG. 1 is a block diagram of a network configuration.

Reference will now be made in detail to the preferred embodiments, examples of which are illustrated in the accompanying drawings, wherein like reference numerals refer to like elements throughout.

FIG. 1 shows a typical network configuration. The network configuration represented is the one that is necessary for a mobile terminal MS1 connected to the 3GPP CS domain to be able to communicate with a mobile terminal MS2 connected to the IMS. The CS domain is connected to the IMS with the aid of a Media Gateway Control Function (MGCF) and an IMS Media Gateway (IM-MGW). The MGCF controls the IM-MGW by using the H.248 protocol standardized by the ITU-T, by way of the so-called 'Mn' interface. On the CS domain side, so-called 'Mobile Switching Center' (MSC) servers, which communicate with each other and with the MGCF by way of BICC signaling, are located in the core network. They control CS MGWs in each case. The CS MGWs are connected among themselves and to the IMS MGW by way of the so-called 'Nb' interface. For video telephony, the so-called 'BS30' data transport service ('bearer service') is used. MS1 is connected to an MSC server of a CS MGW by using a so-called 'radio access network', for example a UTRAN. From the IMS side, the MGCF communicates with the aid of the SIP call control protocol with so-called 'Call Session Control Functions' (CSCF), which pass on the signaling by way of the Gateway GPRS Support Node (GGSN) and a radio access network, for example a UTRAN, to the mobile terminal MS2. Data is transported from the IMS Media Gateway by way of the 'Mb' interface to the GGSN, which likewise passes it on by way of the radio access network to the MS.

Figure 2:
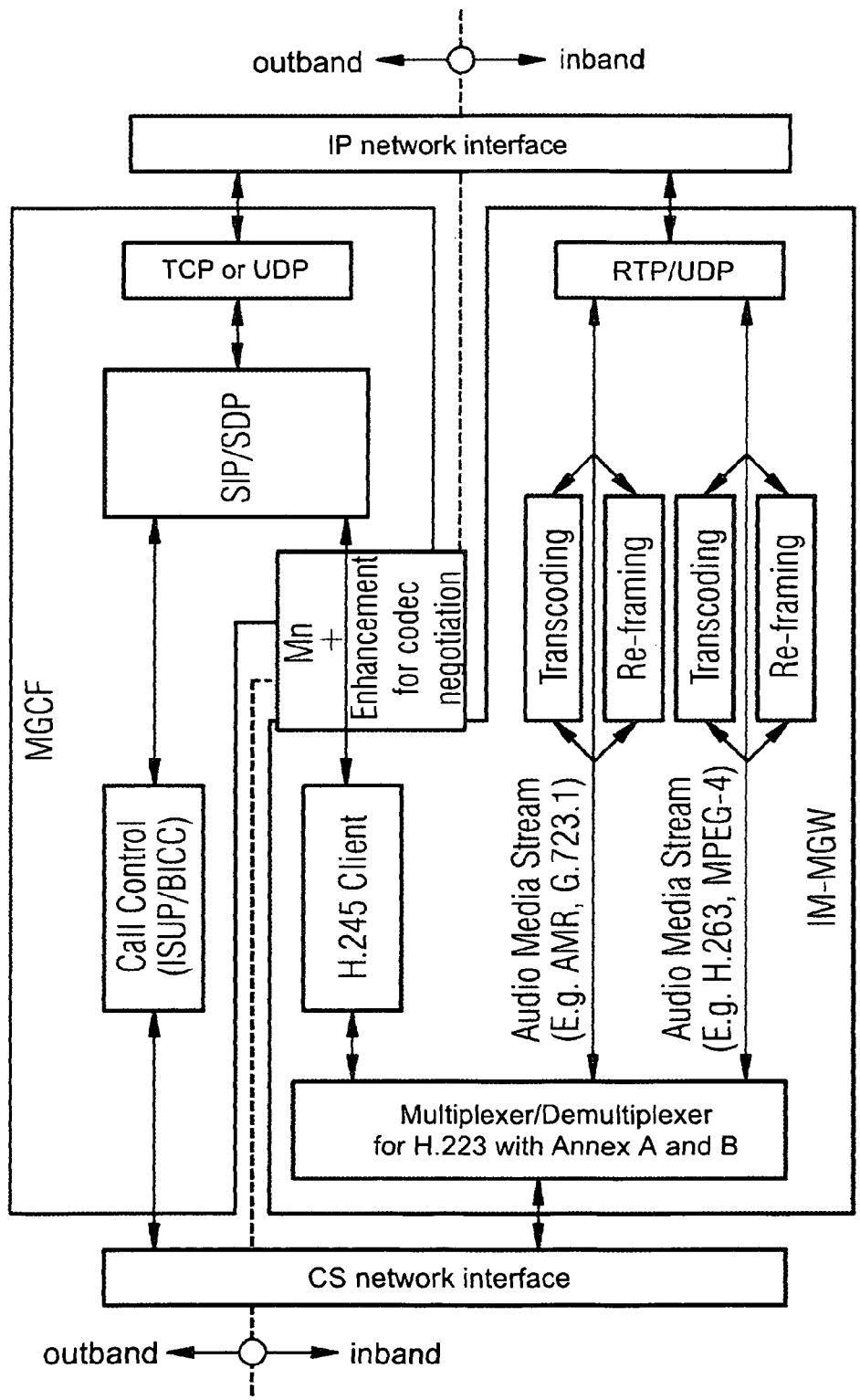
FIG. 2 is a block diagram of the key components.

FIG. 2 shows a block diagram of the key components. Functional key components in the MGCF and the IM-MGW are represented. Accordingly, the so-called 'H.245 client', that is to say the functional unit that terminates the H.245 protocol, is located in the IM-MGW and exchanges, by using the H.248 protocol by way of the 'Mn' interfaces, information referring to the selection of the codecs and the sequence of the call setup with the functional components in the MGCF in charge of the so-called 'call control', preferably with the functional component(s) that are in charge of the handling of the SIP and the SDP on the IMS side. Accordingly, H.245 messages received within the H.223 protocol from the CS side are passed on to the H.245 client by the H.223 multiplexer. Accordingly, the H.245 client also exchanges information referring to the H.223 protocol with the H.223 multiplexer/demultiplexer. In the IM-MGW, so-called 'media streams' for audio and video are handled separately. Depending on the audio and video codecs selected on the IMS side and the CS side and the details of their transport formats in these networks, a transparent passing-on of the data, a so-called 'Re-framing', i.e. a simple change of the transport format, or a complete conversion of the data between different codecs by using a so-called 'transcoder' can optionally be required. The method is aimed at largely avoiding transcoding, particularly for video codecs.

Figure 3:
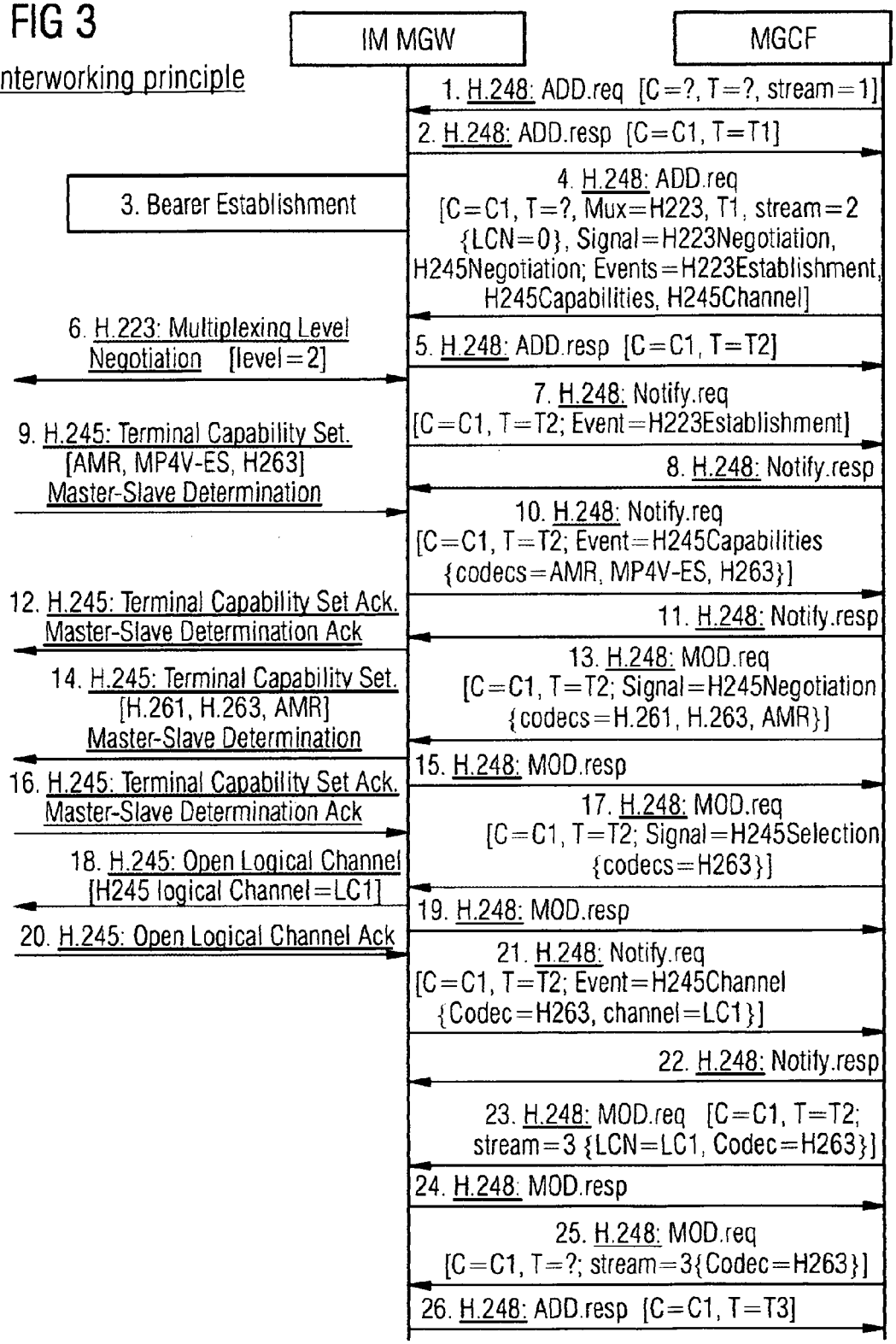
FIG. 3 is a signal flow diagram illustrating the principle of the interworking with respect to an embodiment.

FIG. 3 (Interworking Principle) represents, with the aid of the course of the signaling, the principle of the interworking between the H.245 signaling on the CS side and the H.248 signaling between the MGCF and the IM-MGW.

In detail, the signaling steps are as follows:
1. The MGCF decides to establish an H.324 connection for video telephony on the CS side. The MGCF initially configures the physical so-called 'termination' on the CS network side. For packet transport, the MGCF generates for this purpose a new termination in a new so-called H.248 'context' with the aid of an H.248 'Add' command. For TDM transport, the MGCF can, in place of this, shift an existing termination, which represents a fixed timeslot on a physical link, into a new context. The termination is allocated a so-called H.248 'stream'.
2. The IM-MGW establishes the termination correspondingly and returns the identifiers T1 for the termination and C1 for the context.
3. The CS-side transport connection is set up.
4. The MGCF establishes, as defined by existing H.248.1 and H.248.20 standard, a special logical H.248 termination for describing the multiplexing in the same context C1 and states by the so-called 'Mux' parameter that the multiplexing is described in termination T1 and takes place as defined by the H.223 standard. It describes the logical channel of the H.223 protocol that should be used for the H.245 signaling by using a dedicated stream, which is allocated the so-called 'Logical Channel Number' (LCN) with value 0. Accordingly, the MGCF instructs the IM-MGW to start the H.223 negotiation of the so-called 'multiplexing level', preferably by using a new so-called H.248 'signal', which is referred to as 'H223Negotiation' in this instance.
   Accordingly, the MGCF instructs the IM-MGW to subsequently start the H.245 negotiation, preferably by using a new so-called H.248 'signal', which is referred to as 'H245Negotiation' in this instance. In a variant, 'H223Negotiation' and 'H245Negotiation' are combined into one signal. Accordingly, the MGCF preferably also instructs the IM-MGW to send the MGCF a message as soon as the H.223 negotiation of the so-called 'multiplexing level' has been completed, preferably by using a new so-called H.248 'event', which is referred to as 'H223Establishment' in this instance. Accordingly, the MGCF also instructs the IM-MGW to send the MGCF a message containing codecs supported on the CS side as soon as the IM-MGW receives an H.245 Terminal Capability Set message. Preferably, the MGCF utilizes for this purpose a new so-called H.248 'event', which is referred to as 'H245Capabilities' in this instance. Accordingly, the MGCF also instructs the IM-MGW to send the MGCF a message containing the selected codec and the associated H.245 Logical Channel Number as soon as a logical H.223 channel is opened by using H.245. Preferably, the MGCF utilizes for this purpose a new so-called H.248 'event', which is referred to as 'H245Channel' in this instance.
5. The IM-MGW establishes the new termination correspondingly and returns the identifier T2.
6. The IM-MGW establishes the H.223 connection and in so doing negotiates the multiplexing level, in Example 2.
7. The IM-MGW advises the MGCF that the negotiation of the H.223 multiplexing level has been completed. Preferably, the IM-MGW utilizes for notifying the MGCF a so-called H.248 'Notify' message with the new event 'H223Establishment'.
   The MGCF can use the information received to establish whether an inband H.245 negotiation is possible at the given point in time, which is advantageous because, for example, so-called 'early media' can be passed through or blocked by the call control signaling on the CS side, depending on the networks involved, before the completion of the call setup. If no H.223 signaling is received over a lengthy period of time, the MGCF can also establish the error situation that it has waited for video telephony incorrectly.
8. The MGCF confirms the receipt of the 'Notify' message.
9. The IM-MGW receives a so-called 'Terminal Capability Set' H.245 message, which can be combined with a so-called 'Master-Slave Determination' H.245 message. The Terminal Capability Set H.245 message contains, among other things, information with respect to the voice and video codecs supported by the terminal on the CS network side and the details of their configuration.
10. Accordingly, the IM-MGW passes the received information on by way of the codecs. Preferably, the IM-MGW utilizes for this purpose a so-called H.248 'Notify' message containing the new event 'H245Capabilities', which contains suitable parameters for specifying the codecs, for example as SDP or encoded in the form of the so-called H.248 'SDP equivalents'.
    In an advantageous variant, the IM-MGW deletes codecs that it does not support before it passes the information on to the MGCF.
11. The MGCF confirms the receipt of the 'Notify' message.
12. The IM-MGW confirms the Terminal Capability Set H.245 message and the Master-Slave Determination H.245 message.
13. The MGCF instructs the IM-MGW to offer specific codecs in the H.245 negotiation, for example because the MGCF has received corresponding information within SIP/SDP messages on the IMS side. It is advantageous if the MGCF also takes account of the codecs supported by the IM-MGW. The MGCF either possesses configured knowledge about these capabilities or it retrieves these capabilities from the IM-MGW by using a so-called H.248 'AuditCapabilities' message. In an advantageous variant, the MGCF does not itself take account of the codecs supported by the IM-MGW, but instead passes all eligible codecs on to the IM-MGW. The IM-MGW then itself deletes codecs that it does not support before it passes the information on in H.245 signaling.
    Preferably, the MGCF utilizes the new so-called H.248 'signal', 'H245Negotiation', within an H.248 'Modify' message, and specifies the codecs as suitable parameters of the signal, for example as SDP or encoded in the form of the so-called H.248 'SDP equivalents'.
14. The IM-MGW sends a Terminal Capability Set H.245 message in which it provides information with respect to capabilities supported on the IM-MGW side, for example referring to H.223 protocol options, which message passes on the information referring to the codecs that was received in message 13 from the MGCF and also takes account of the H.223 multiplexing level defined in Step 6. In the example, the IM-MGW combines this message with a Master-Slave Determination H.245 message.
15. The IM-MGW sends a confirmation of the H.248 'Modify' message.
16. The IM-MGW receives a confirmation of the Terminal Capability Set H.245 message and the Master-Slave Determination H.245 message.
17. The MGCF selects codecs for the video telephony, taking account of information from the SIP/SDP signaling on the IMS side and also the information contained in message 10 referring to the CS-side terminal. Preferably, the MGCF selects codecs which are supported both on the IMS side and the CS network side in order to avoid a transcoding operation.
    Accordingly, the MGCF instructs the IM-MGW to configure logical channels for these codec(s). Preferably, the MGCF utilizes the new so-called H.248 'signal', 'H245Selection', within an H.248 'Modify' message, and specifies the codecs as suitable parameters of the signal, for example as SDP or encoded in the form of the so-called H.248 'SDP equivalents'.

In a variant, not represented in this instance, the MGCF omits the definitive selection of the codecs and leaves this decision to the IM-MGW. The IM-MGW would then select from the set of the codecs contained in messages 9 and 13 and also the codecs that it supports itself.

18. The MGCF sends a so-called 'Open Logical Channel' H.245 message for the codecs received in message 17, in which message it uses the H.223 Logical Channel Number (LCN) corresponding to the selected codec, which was defined previously by using the Terminal Capability Set H.245 messages 9 or 14.

In a case not represented in this instance, it can also happen that the IM-MGW receives an 'Open Logical Channel' H.245 message from the CS network. In this case, a selection has been made from the capabilities offered in the Terminal Capability Set message 14 in the CS network.

19. The IM-MGW confirms the 'Modify' message. Should the IM-MGW not be in a position to establish the requested logical channels, for example because it is the H.245 'Slave', it preferably advises this fact in this message.

20. The IM-MGW receives a so-called 'Open Logical Channel Ack' H.245 message.

21. Accordingly, the IM-MGW informs the MGCF as soon as a logical channel has been opened by using H.245 and in so doing forwards the H.223 Logical Channel Number used and also the corresponding codec. The IM-MGW ascertains the codec with the aid of the Logical Channel Number signaled in the corresponding 'Open Logical Channel' message and the information assigned to it in the Terminal Capability Set H.245 messages 9 or 14.

Preferably, the IM-MGW utilizes for this purpose a so-called H.248 'Notify' message containing the new event 'H245Channel', which contains suitable parameters for specifying the codecs and also the Logical Channel Number, for example as SDP or encoded in the form of the so-called H.248 'SDP equivalents'.

22. The MGCF confirms the receipt of the 'Notify' message.

23. The MGCF instructs the IM-MGW to establish the logical H.223 channel, which has already been agreed by way of H.245 signaling with the aid of the messages 21 to 26. For this purpose, the IM-MGW sends an H.248 'Modify' message referring to the multiplexing termination T2 in which it describes a new 'stream 3', specifying the LCN and the codec as in message 21.

24. The IM-MGW sends a confirmation of the H.248 'Modify' message.

25. The MGCF instructs the IM-MGW to establish a termination on the IMS side to which stream 3 should be connected, so that the IM-MGW passes on the data assigned to stream 3 that is received on the IMS side or the CS network side to the other side in each case. For this purpose, the IM-MGW sends an H.248 'Add' message referring to context C1 in which it specifies that stream 3 is to be transported and which codec is to be used for this. If the same codec is specified in messages 23 and 25, the IM-MGW detects the fact that no transcoding is required.

26. The IM-MGW confirms the 'Modify' message.

27. The steps 17 to 26 are also implemented in order to configure the stream 4 for the bearer for the transport of the voice, and the corresponding voice codec for a termination T4.

Figure 4:
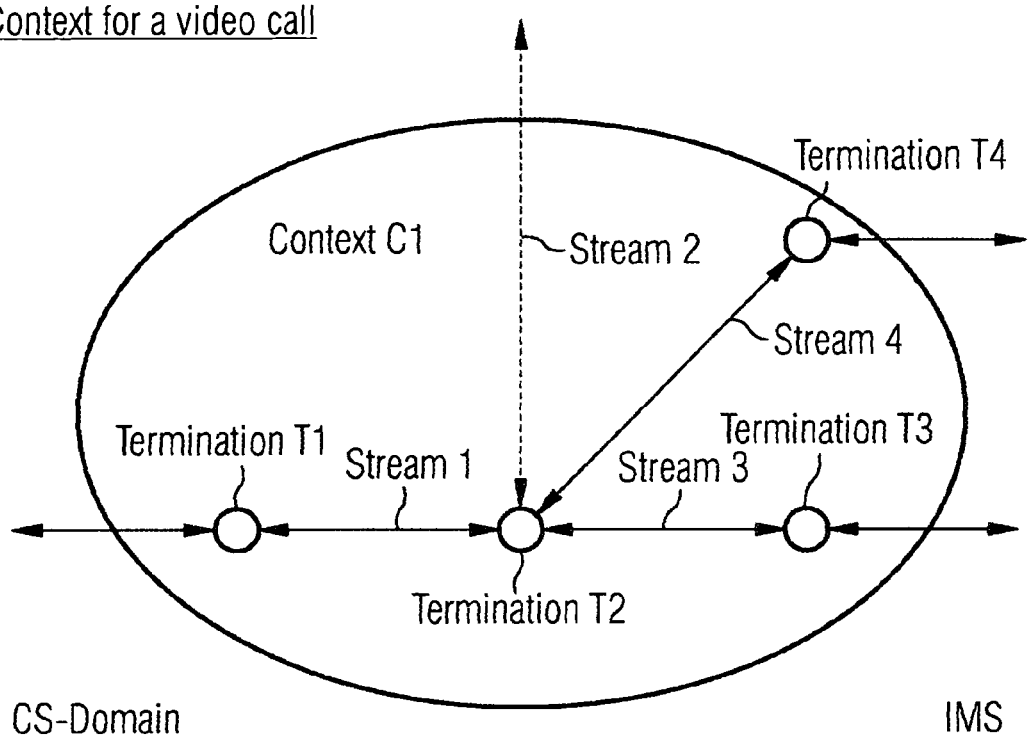
FIG. 4 is a block diagram illustrating the context for a video call.

The H.248 context for a video call therefore appears as shown in FIG. 4.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method for setting up a video or multimedia call, which, after being set up, runs by way of a circuit-switched telecommunications network and by way of another telecommunications network which utilizes session initiation protocol for signaling, said method comprising:

sending, by a media gateway control device to a media gateway device, a message instructing the media gateway device to conduct inband negotiations with the circuit-switched telecommunications network, the message including video codecs usable for video or multimedia telephony, the media gateway control device sending only codecs to the media gateway device that are supported at the media gateway device, the media gateway control device being provided for interworking between the circuit-switched telecommunications network and the other telecommunications network concerning signaling and the media gateway device being provided for interworking between the circuit-switched telecommunications network and the other telecommunications network concerning bearer, the media gateway device being included in the other telecommunications network; and setting up the video or multimedia telecommunications call by conducting, by the media gateway device, the in band negotiations based on the instructions from the media gateway control device, wherein the circuit-switched telecommunications network includes a 3rd Generation Partnership Project circuit-switched domain or a public switched telephone network, and wherein the other telecommunications network includes an Internet protocol multimedia sub system telecommunications network.

2. The method as claimed in claim 1, wherein the media gateway control device is part of the Internet protocol multimedia sub system telecommunications network, and wherein said instructing of at least the media gateway device by the media gateway control device and said carrying out at least the inband negotiations by the media gateway device include implementing an H.223 protocol negotiation of an H.223 multiplex level to be used for the video telecommunications connection in the Internet protocol multimedia subsystem telecommunications network;

subsequently implementing, for setup of an H.324 video telecommunications connection in the circuit-switched telecommunications network, an H.245 protocol negotiation referring to the video codecs usable for video or multimedia telephony; and informing the media gateway control device as soon as H.223 transport channels for the video telecommunications call have been opened by using an H.245 signaling operation.

3. The method as claimed in claim 2, wherein said instructing includes giving instructions if the media gateway control device detects or assumes based on call control signaling during call setup that video telephony as defined by the H.324 protocol is required by the circuit-switched telecommunications network.

4. The method as claimed in claim 3, further comprising configuring the media gateway device by the media gateway control device using H.248 add or modify messages, when establishing termination in charge of handling of the H.223 multiplex level.

5. The method as claimed in claim 4, further comprising inserting, by the media gateway control device, at least one H.248 signal in messages to the media gateway device, indicating that the H.223 and/or H.245 negotiation should be implemented.

6. The method as claimed in claim 5, further comprising:
demanding a first notification about the setup of logical H.223 channels, by the media gateway control device inserting a first H.248 event into a first H.248 message to the media gateway device; and
notifying the media gateway control device by the media gateway device utilizing a first H.248 notify message specifying the first H.248 event if a logical H.223 channel is opened by using H.245 signaling.

7. The method as claimed in claim 6, further comprising specifying, by the media gateway device, a selected codec and a logical channel number in the first notification about opening of the logical H.223 channel, as parameters of the event used in the first notification.

8. The method as claimed in claim 7, further comprising notifying the media gateway control device by the media gateway device if the H.223 negotiation of the multiplex level has been terminated or has failed.

9. The method as claimed in claim 8, further comprising:
demanding a second notification about the H.223 negotiation of the multiplex level from the media gateway control device utilizing a second H.248 event which the media gateway control device inserts in a second H.248 message to the media gateway device; and
notifying the media gateway control device by the media gateway device utilizing a second H.248 notify message specifying the second H.248 event if the logical H.223 channel is opened by using H.245 signaling.

10. The method as claimed in claim 9, further comprising instructing the media gateway device under control of the media gateway control device to pass on the data channel transparently when the connection setup is forwarded by the Internet protocol multimedia subsystem telecommunications network to another media gateway control device in a call setup from the circuit-switched network side by the media gateway control function device in the direction of the Internet protocol multimedia subsystem telecommunications network.

11. The method as claimed in claim 10, further comprising implementing the H.245 procedures for master-slave determination autonomously by the media gateway device.

12. The method as claimed in claim 11, further comprising sending and receiving H.245 terminal capability set messages autonomously by the media gateway device.

13. The method as claimed in claim 12,
wherein the transfer of codecs between the media gateway control device and the media gateway device is omitted, and
wherein said method further comprises selecting, by the media gateway control device and the media gateway device, same voice and video codecs in the session initiation
protocol/session description protocol out-of-band negotiation for the Internet protocol multimedia subsystem or in the H.245 inband negotiation for the circuit-switched network, respectively.

14. The method as claimed in claim 13, further comprising exchanging information referring to the codecs supported between the media gateway device and the media gateway control device.

15. The method as claimed in claim 14, wherein said sending of at least one of the terminal capability set messages by the media gateway control device includes instructions for the media gateway device as to the codecs that the media gateway device should specify.

16. The method as claimed in claim 14, further comprising: receiving the codecs in the session initiation protocol/session description protocol signaling on the Internet protocol multimedia subsystem; and
sending the codecs from the media gateway control device to a media gateway control function.

17. The method as claimed in claim 14, further comprising: selecting, by the media gateway device, supported codecs among the codecs received
from the media gateway control device that are supported by the media gateway device, and
sending the supported codecs in at least one of the terminal capability set messages.

18. The method as claimed in claim 17, further comprising specifying, by the media gateway control device, the codecs in an add or modify message as parameters of a signal that instructs the media gateway device to implement the H.245 negotiation.

19. The method as claimed in claim 18, wherein the media gateway control device specifies the codecs if it instructs the media gateway device to start the H.245 negotiation.

20. The method as claimed in claim 19, wherein said specifying of the codecs by the media gateway control device utilizes a third H.248 message which the media gateway control device sends if the information referring to the codecs is received in an session initiation protocol message.

21. The method as claimed in claim 20, further comprising
advising the media gateway control device in a terminal capability set message sent by the media gateway device regarding received codecs that have been received by the media gateway device.

22. The method as claimed in claim 21, wherein said advising by the media gateway device only advises the media gateway control device of the supported codecs included among the received codecs.

23. The method as claimed in claim 22, further comprising:
demanding a third notification about the received codecs using a terminal capability set message by the media gateway device, the media gateway control device utilizes a third H.248 event which the media gateway control device inserts in a third H.248 message in which the media gateway device is instructed to start the H.245 negotiation; and upon subsequently receiving the terminal capability set message at the media gateway device, notifying the media gateway control device by the media gateway device using an H.248 notify message that specifies the third H.248 event.

24. The method as claimed in claim 23, further comprising:
exchanging the H.245 terminal capability set messages and completing the H.245 master-slave determination; and
after said exchanging and completing, opening the logical H.223 channels by the media gateway device autonomously assuming that the media gateway device is in charge of such according to an outcome of the master-slave determination.

25. The method as claimed in claim 24, further comprising instructing the media gateway device by the media gateway control device to set up the logical H.223 channels for specific codecs.

26. The method as claimed in claim 25, wherein said specifying of the specific codecs and the logical channels by the media gateway control device uses special parameters of a suitable signal within an H.248 modify message.

27. The method as claimed in claim 26, further comprising informing the media gateway device by the media gateway control device if inband negotiation using H.245 has failed because no matching capabilities were found that would have permitted a transmission of video telephony.

28. The method as claimed in claim 27, further comprising instructing the media gateway device by the media gateway control device, either as early as during first configuration of terminations or after notification about a successful inband negotiation, to establish the connection.

29. The method as claimed in claim 2, wherein the media gateway control device either possesses configured knowledge about the codecs that are supported at the media gateway device or retrieves the codecs that are supported at the media gateway device from the media gateway device by using an H.248 AuditCapabilities message.

30. A media gateway control device for controlling the set up a video or multimedia telecommunications call, which, after being set up, runs by way of a circuit-switched telecommunications network and by way of an Internet protocol based network, which includes the media gateway control device, said media gateway control device comprising:
a processor configured to control the set up the video or multimedia telecommunications call by executing an algorithm including:
sending a message to a media gateway device, which is included in the Internet protocol based network, the message instructing the media gateway device to conduct inband negotiations with the circuit-switched telecommunications network, to the message including video codecs usable for video or multimedia telephony, the media gateway control device sending only codecs to the media gateway device that are supported at the media gateway device; and
receiving information from the media gateway device as soon as the inband negotiations have been conducted,
wherein the circuit-switched telecommunications network includes a 3rd Generation Partnership Project circuit-switched domain or a public switched telephone network, and
wherein the Internet protocol based network includes an Internet protocol multimedia subsystem telecommunications network.

31. A media gateway device for collaboration with a media gateway control device in the context of a video or multimedia call, which, after being set up, runs by way of a circuit-switched telecommunications network and by way of an Internet protocol based network (IMS), which includes the media gateway control device, said media gateway device comprising:
a processor configured to execute:
receiving a message including instructions from the media gateway control device to conduct inband negotiations with the circuit-switched telecommunications network, to the message including video codecs usable for video or multimedia telephony, the media gateway device receiving only codecs from the media gateway control device that are supported at the media gateway device; and
setting up the video or multimedia telecommunications call by conducting the in band negotiations based on the instructions from the media gateway control device,
wherein the circuit-switched telecommunications network includes a 3rd Generation Partnership Project circuit-switched domain or a public switched telephone network,
wherein the Internet protocol based network includes an Internet protocol multimedia subsystem telecommunications network, and
wherein the media gateway device is included in the Internet protocol based network.

32. A call control system in an IP-based network for controlling the setup of calls, said call control system comprising:
a media gateway control device provided for interworking between said IP-based network and a CS switched network on signaling level when a call is extending to the circuit-switched network; and
a media gateway device provided for interworking between said IP-based network and a CS switched network on bearer level when a call is extending to the circuit-switched network, the media gateway device being included in the IP-based network,
wherein, for the setup of a video or multimedia call, the media gateway control device sends a message to the media gateway device that instructs the media gateway device to conduct inband negotiations with the circuit-switched telecommunications network, to the message including video codecs usable for video or multimedia telephony, the media gateway control device sending only codecs to the media gateway device that are supported at the media gateway device,
wherein the media gateway device setting up the video or multimedia telecommunications call by conducting the in band negotiations based on the instructions from the media gateway control device,
wherein the CS switched network includes a 3rd Generation Partnership Project circuit-switched domain or a public switched telephone network, and
wherein the IP-based network includes an Internet protocol multimedia subsystem telecommunications network.

* * * * *